United States Patent
Tseng

[19]

[11] Patent Number: 5,961,266
[45] Date of Patent: Oct. 5, 1999

[54] ANTI-VIBRATION BOLT AND NUT STRUCTURE

[76] Inventor: Shao-Chien Tseng, No. 130 Sec 2. Yang-Shin Rd., Yang-Mei, Taoyuan 326, Taiwan

[21] Appl. No.: 09/096,198

[22] Filed: Jun. 11, 1998

[51] Int. Cl.[6] .............................. F16B 35/02; F16B 37/12
[52] U.S. Cl. ......................... 411/383; 411/289; 411/433; 411/438
[58] Field of Search ..................................... 411/324, 383, 411/384, 386, 411, 433, 438, 289, 290

[56] References Cited

U.S. PATENT DOCUMENTS

| | | | |
|---|---|---|---|
| 2,888,853 | 6/1959 | Pachmayr | 411/438 |
| 3,943,587 | 3/1976 | Lasky | 411/438 X |
| 4,040,326 | 8/1977 | Breed | 411/438 X |
| 4,298,297 | 11/1981 | Courson | 411/438 X |
| 5,101,213 | 3/1992 | Harada et al. | 411/411 X |
| 5,312,214 | 5/1994 | Morton | 411/438 X |

*Primary Examiner*—Neill Wilson
*Attorney, Agent, or Firm*—Pro-Techtor International Services

[57] ABSTRACT

An anti-vibration bolt and nut structure with the shank of a bolt including a plurality of axial teeth. The shank is received in an external threaded sleeve comprising a helical spring. An external wall of the sleeve includes a plurality of engaging internal teeth that mesh with the axial teeth so that the rotational force created by turning the head of the bolt is transmitted to the threads. The shank of the bolt includes a screw hole that can be rotated to rotate the shank when the bolt is use in a closed screw connection threaded hole. The nut includes a hole having a plurality of axial internal engaging teeth that mesh with external engaging teeth of an internal threaded lining to engage the internal threads with the nut. A screw hole in the internal threaded lining to receive a screw so that the internal threaded lining is engaged in the nut. The bolt and the nut can be used with a conventional nut and a conventional bolt respectively.

4 Claims, 5 Drawing Sheets

ANTI-VIBRATION BOLT AND NUT STRUCTURE

BACKGROUND OF THE INVENTION

1. Field of the Invention

The present invention is an anti-dead locking, anti-vibration, and loosening-proof bolt and nut structure taking advantage of the spring nature of an external threaded sleeve and an internal threaded lining in cooperation with relative movability after engagement of a plurality of axial teeth and engaging internal teeth. The bolt and nut structure is used for a locking environment where a bolt and a closed screw connection threaded hole or a nut are to be assembled. The structure has effects such as vibration absorption (i.e., anti-vibration), anti-dead locking and breakage resistance.

2. Description of the Prior Art

The conventional locking technique of a bolt (or screw) and a nut includes principally external threads and internal threads provided respectively on the shank of a bolt and a nut. Rotational engagement of the external threads and the internal threads creates an axial clamping or course guiding action. Various threads, no matter whether they are the conventional triangular, square or trapezoid threads, can convert the twisting force created by rotating a screw or a nut into an axial locking thrust by a frictional pushing force between the threads mutually engaged. Therefore, tight screw connection between the locking members under normal conditions can be effected. However, many screw connection situations are subject to vibration. Examples are a screw connection of mechanical transmitting components between a transmission axle and a wheel rim on a car, on the housing of an airplane, on a tunnel drilling machine with high vibrational frequency, on an oil drilling machine, a pile driver, an engine, an air compressor, an oil compressor, etc. When vibration is present, the screw connections are subject to loosening or breaking.

When threads are mutually engaged, the sets of threads must have therebetween a tolerance to allow rotational advancing of the threads. However, the tolerance prevents the surfaces of the threads from being in complete contact for giving a frictional pushing force. In other words, after the components are joined, the surfaces not in contact due to the tolerance make the twisting force for resisting loosening by friction on each thread surface unable to withstand the vibrational force from the exterior so that loosening occurs. The rigidity provided by the engagement of the threads tends to generate shearing force, and the screw or bolt can be broken to induce a dead locked state.

SUMMARY OF THE INVENTION

The primary object of the present invention is to use the spring nature of an external threaded sleeve and an internal threaded lining in cooperation with the relative elastic movability after engagement of a plurality of axial teeth and engaging internal teeth to create an improved bolt and closed nut mechanism.

In order to obtain the stated object, the present invention uses the following techniques:

1. The shank of a bolt is provided with a plurality of axial teeth. The shank is received in an external threaded sleeve comprising a helical spring. An external wall of the sleeve includes a plurality of engaging internal teeth that mesh with the axial teeth so that the rotational force created by turning the head of the bolt is transmitted to the threads. The spring nature of the external threaded sleeve absorbs the external vibration force, and increases the engaging force between the teeth.

2. The shank of the bolt is provided with a screw hole for inserting therein a collar to receive a screw with a head. Thus, when the bolt is used in a closed screw connection threaded hole, the screw is received in the screw hole of the shank of the bolt. After the collar contacts the end wall of the screw connection threaded hole, the head of the screw can be rotated to rotate the shank of the bolt. Therefore, when the shank of the bolt is inadvertently blocked in a threaded hole, it can be taken out easily by rotating the screw.

3. The nut is provided with a hole having a plurality of axial internal engaging teeth that mesh with external engaging teeth of an internal threaded lining. The internal threads are thereby engaged with the nut. The internal threaded lining is in the form of a helical spring.

4. A screw hole is provided on one side of the internal threaded lining of the nut to receive a screw. A screw is provided for the screw hole so that the internal threaded lining having the spring nature can be stably engaged in the nut. By the locking action of the screw, the engaging force between the internal threads of the internal threaded lining and the external threads of the external threaded sleeve is increased.

The bolt and the nut of the present invention can be practically used respectively with a conventional nut and a conventional bolt. The bolt can be used in a closed screw connection threaded hole needing no nut.

The present invention will be apparent in its practical structure after reading the detailed description of the preferred embodiments thereof in reference to the accompanying drawings.

DETAILED DESCRIPTION OF THE PREFERRED EMBODIMENT

Figure 1:
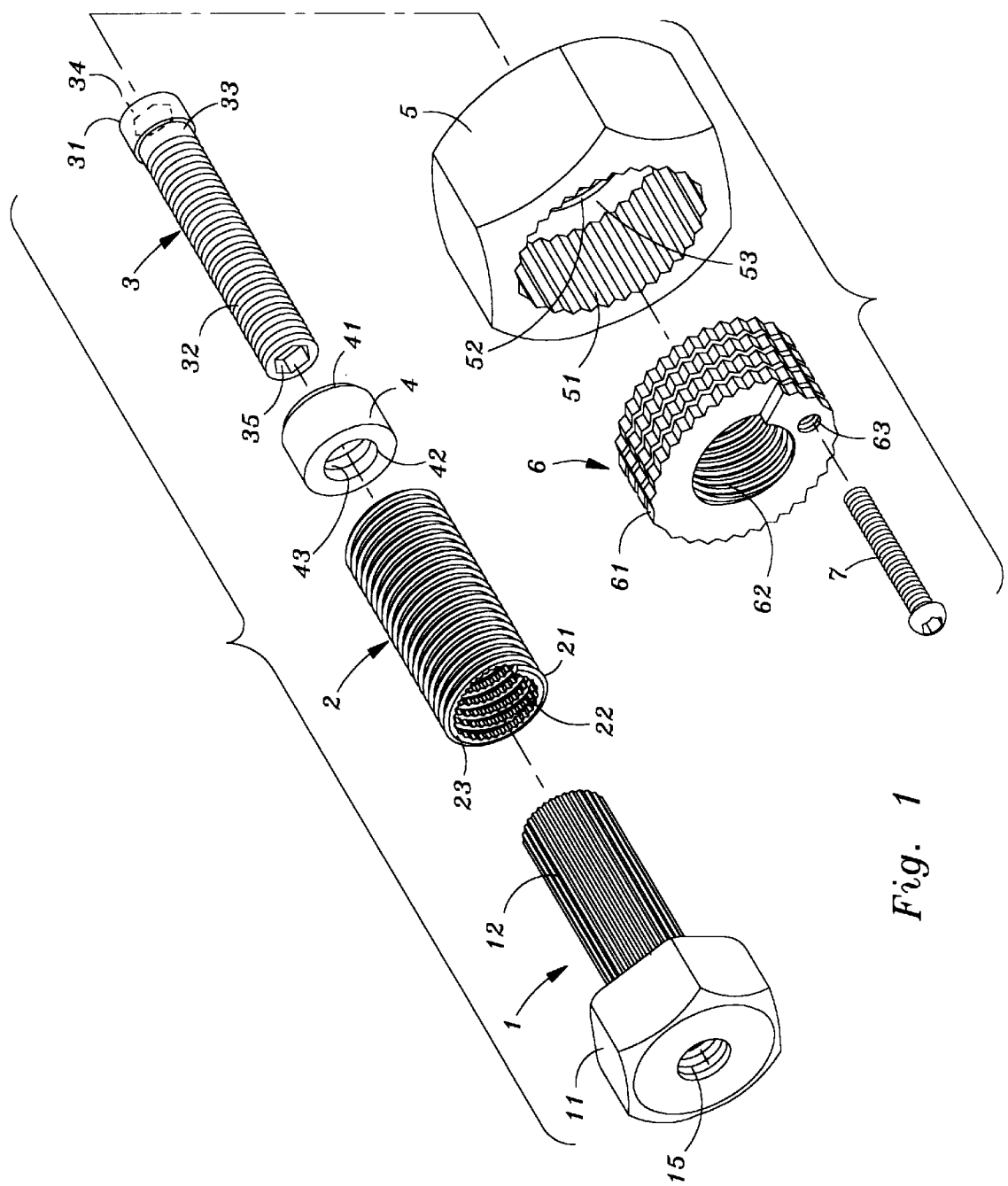
FIG. 1 is a exploded perspective view of the present invention.

Referring to FIG. 1, the bolt structure of the present invention comprises a shank 1, an external threaded sleeve 2, a countersunk screw 3, and a collar 4. The shank 1 has a hexagonal bolt head 11 and a plurality of axial teeth 12.

The external threaded sleeve 2 is formed as a helical spring. Each ring 23 of the sleeve 2 has an external thread 21. The inner hole of the external threaded sleeve 2 includes a plurality of engaging internal teeth 22.

The axial teeth 12 of the shank 1 engage the axial engaging internal teeth 22 of the external threaded sleeve 2. Hence the external threaded sleeve 2 is mounted on the shank 1 and can be slightly compressed.

The shank 1 is provided at the center thereof with a through screw hole 15. The countersunk screw 3 is screwed in from the end of the shank 1 and locked against the collar 4. One end of the countersunk screw 3 includes a head 31. The shank of the screw 3 includes a thread portion 32, and a bare shank portion 33 is formed between the thread portion 32 and the head 31. Both ends of the screw 3 include hexagonal depression 34/35 that receive a hexagonal wrench.

The collar 4 includes a hole 42 for the bare shank portion 33, and a head hole 43 to receive the head 31. The head hole 43 of the collar 4 includes a tapered conical surface 41. The collar 4 receives the head 31 of the countersunk screw 3 and the bare shank portion 33 so that a central collar (FIGS. 2 and 3) is formed to lower the chance of contact of the head 31 with any exterior article.

Figure 2:
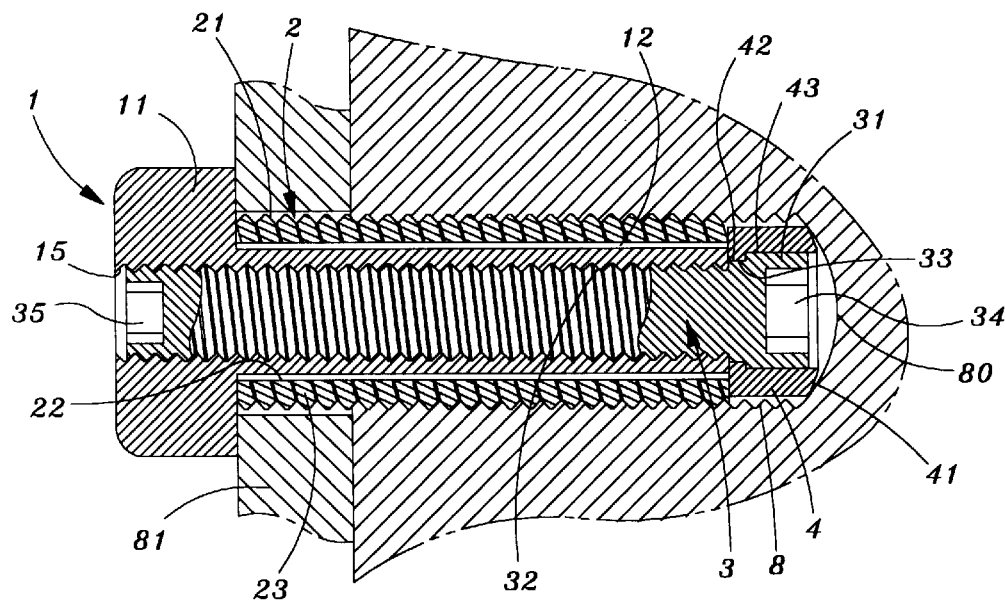
FIG. 2 is sectional view showing use of the present invention in a closed screw connection threaded hole.

When in use, the collar 4 is first slipped over the countersunk screw 3, then the thread portion 32 of the countersunk screw 3 is locked in the central through screw hole 15 of the shank 1, so that the head 31 and the bare shank portion 33 can force the collar 4 to tightly abut the end of the external threaded sleeve 2 placed over the shank 1 (FIG. 2).

The purpose of the countersunk screw 3 extending through the collar 4 is, in addition to securing the external threaded sleeve 2 on the shank 1, to contact an end wall 80 of a screw connection threaded hole 8 to thereby create a base to enable removal of the shank 1.

Figure 6:
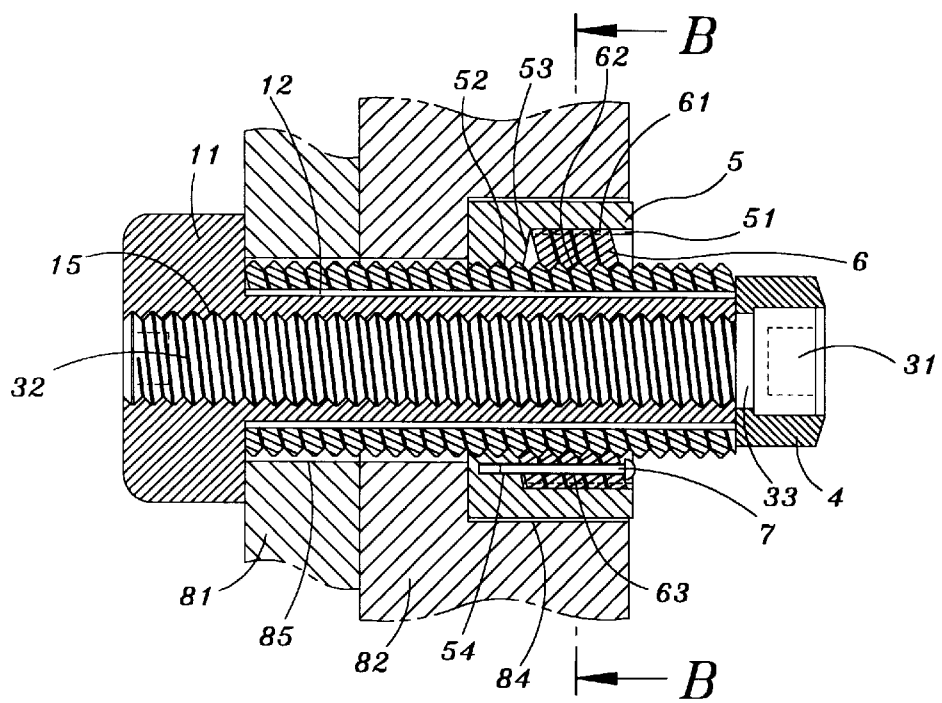
FIG. 6 is a sectional view showing connection of the bolt and the nut.
Figure 7:
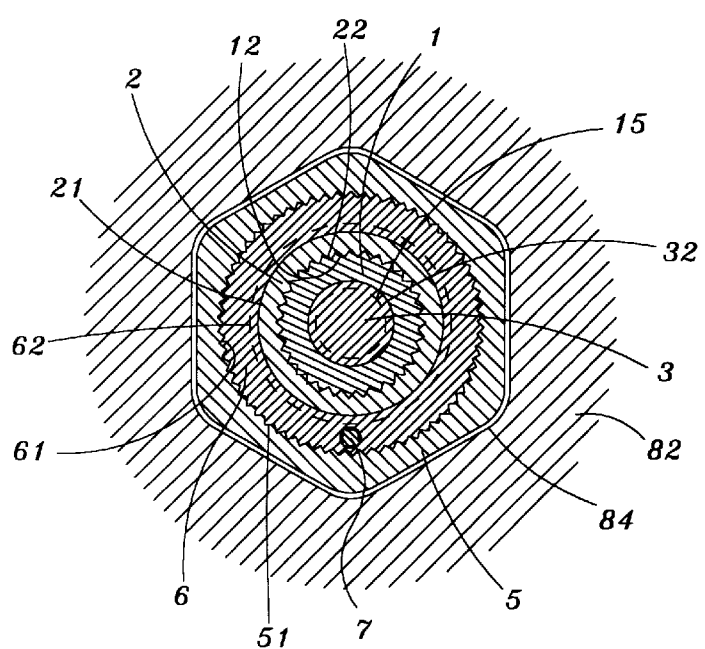
FIG. 7 is a sectional view taken along line B—B in FIG. 6.

As shown in FIG. 1, the nut structure of the present invention is comprised of a nut body 5, an internal threaded sleeve 6 and a screw 7. The nut body 5 includes a hole 51 with a plurality of axial internal engaging teeth, and a concentric round threaded hole 52 of a smaller diameter. Referring to FIG. 6 or 7, a screw hole 54 is provided on a plate 53 between the smaller threaded hole 52 and the larger hole 51.

The internal threaded sleeve 6 is formed as a helical spring. Each ring 64 of the sleeve 6 has a plurality of axial external engaging teeth 61. Each ring 64 also has internal threads 62. Referring now to FIGS. 6 and 7, one end of the internal threaded sleeve 6 is provided with a screw hole 63 corresponding in location to the screw hole 54 on the nut body 5. The screw 7 is inserted in the screw hole 63 so that the internal threaded sleeve 6 is firmly fixed in the nut body 5.

When the bolt structure is used in a closed screw connection threaded hole 8 for locking an article 81 (FIG. 2), the threaded sleeve 2 engaging with the axial teeth 12 of the shank 1 acts as a spring to absorb vibration and to keep the bolt firmly secured in the threaded hole 8.

Figure 3:
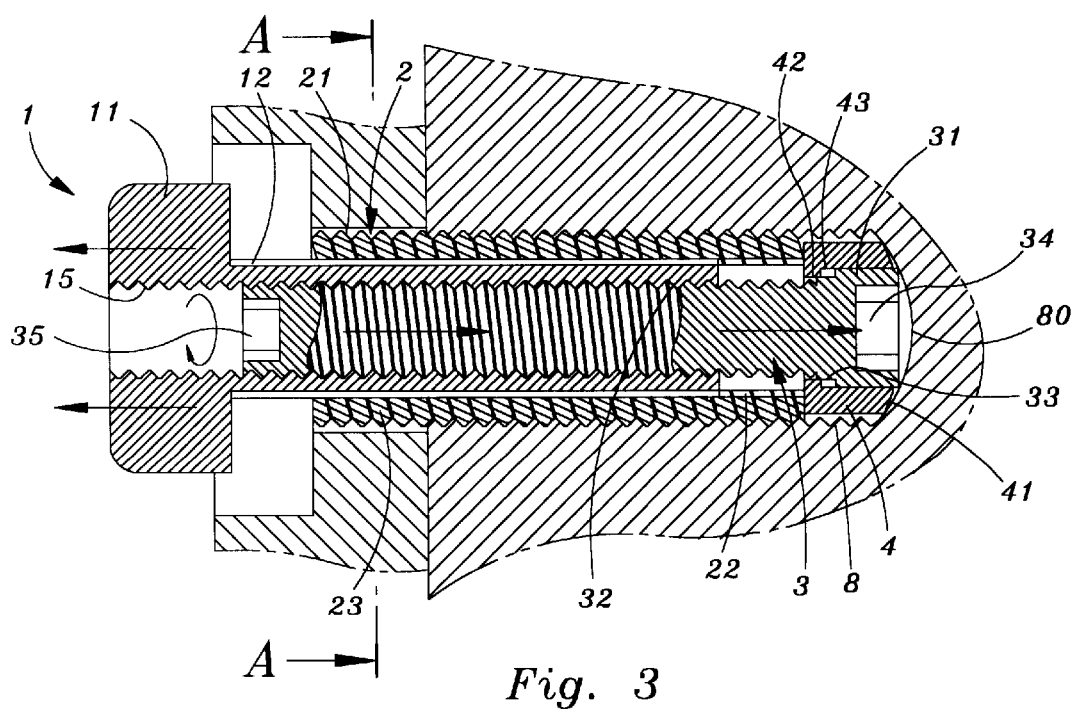
FIG. 3 is a sectional view showing use of the present invention in a closed screw connection thread hole and removing the shank of a bolt.
Figure 4:
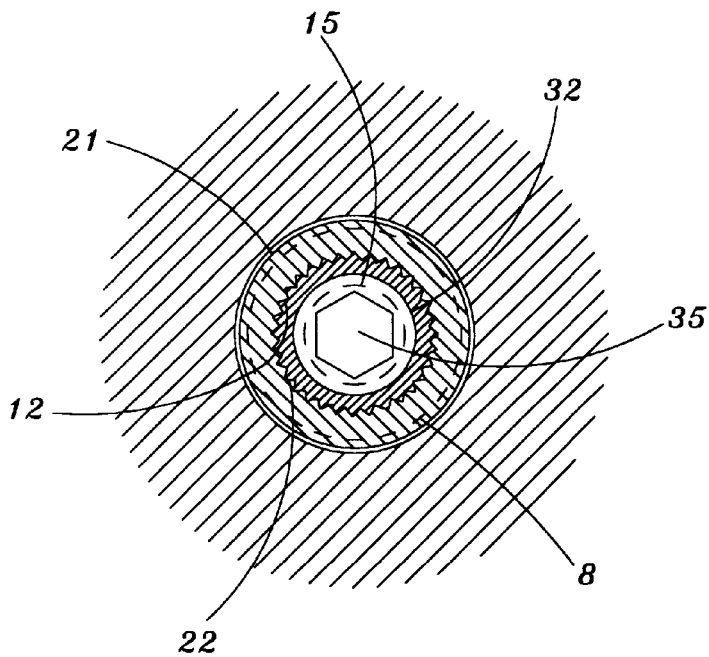
FIG. 4 is a sectional view taken along line A—A in FIG. 3.

When the shank 1 of the present invention is fixedly locked in the screw connection threaded hole 8 (as shown in FIGS. 3 and 4), when a vibration or some other force causes the bolt to be jammed, the countersunk screw 3 screwed in the shank 1 can be used by placing a hexagonal wrench into the screw hole 15 of the shank 1 and into the hexagonal countersink 35 of the countersunk screw 3 and rotating the hexagonal wrench to advance the countersunk screw 3 toward the end wall 80 of the closed screw connection threaded hole 8. This causes the head 31 of the countersunk screw 3 to contact the end wall 80 through the collar 4. By continuing to rotate the threads 32 of the countersunk screw 3, the threads in the screw hole 15 receive a reaction force from the end wall 80 to exert a pushing force on the shank 1. In this way, the shank 1 can be pushed along the axial teeth 12 out of the screw connection threaded hole 8 which has been blocked. The threaded sleeve 2 remains engaged in the screw connection threaded hole 8, which aids the axial teeth 12 in moving along the axial slits 22 directly when the shank 1 is once again assembled.

Figure 5:
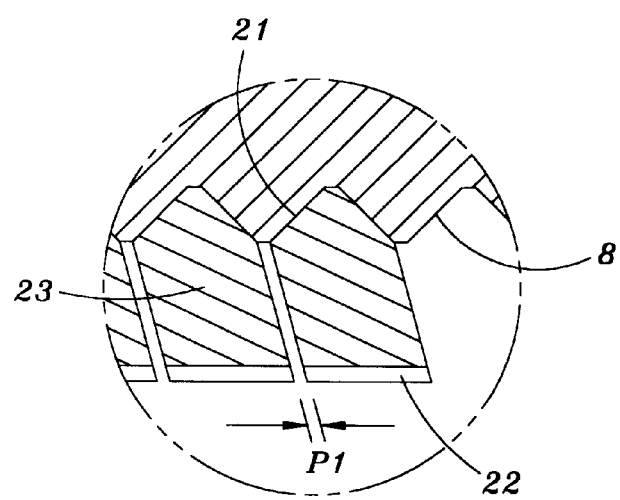
FIG. 5 is an enlarged sectional view showing engagement of an external threaded sleeve with the screw connection threaded hole.

When the external teeth 21 of the external threaded sleeve 2 are engaged with the screw connection threaded hole 8 (as shown in FIG. 5), the threads 23 of the external threaded sleeve 2 maintain a thread space P1 in order to allow compression. When the vibration force is transmitted via the screw connection threaded hole 8, the force is absorbed by the thread spaces P1.

When the bolt structure and the nut structure of the present invention are assembled with each other (as shown in FIGS. 6 and 7), the bolt structure and the nut structure are extended respectively into a connection hole 84 and a connection hole 85 respectively of a base plate and the article to be assembled 81. The external threads 21 of the threaded sleeve 2 engage the internal threads 62 of the internal threaded sleeve 6 of the nut 5. When the bolt and the nut are in position, the screw 7 on the internal threaded sleeve 6 is screwed tight to make every internal thread 62 of the internal threaded sleeve 6 reduce the distance of a thread space P2 (to be described later), and compress the external threads 21 to create a two way rotation locking action.

Figure 8:
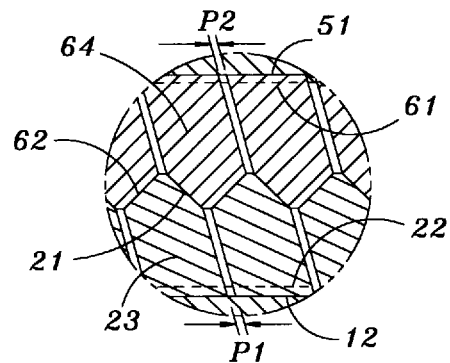
FIG. 8 is an enlarged sectional view showing engagement of the external threaded sleeve with an internal threaded lining.

When the external threads 21 of the threaded sleeve 2 and the internal threads 62 of the internal threaded sleeve 6 are engaged mutually (referring to FIG. 8), the threads 23 of the threaded sleeve 2 not only maintain their thread spaces P1 in order to be compressible, but also the rings 64 of the internal threaded sleeve 6 similarly keep their thread spaces P2 in order to be compressible. The thread spaces P2 can be adjusted by the screw rod 7, so that vibration force can be absorbed by compression of the thread spaces P1 and P2.

Figure 9:
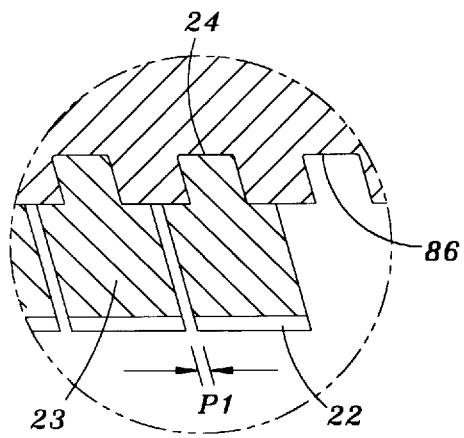
FIG. 9 is an enlarged sectional view showing engagement of an external threaded sleeve with an internal threaded lining of another embodiment.
Figure 10:
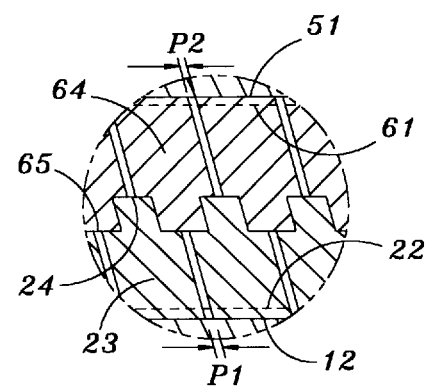
FIG. 10 is an enlarged sectional view showing engagement of an external threaded sleeve with an internal threaded lining of another embodiment.

Further in practicing the present invention as stated above, the external threads 21 of the threaded sleeve 2 and the internal threads 62 of the internal threaded sleeve 6 in the embodiment are formed as triangular threads. Practically, the threads can also be made square or trapezoidal as are shown by the internal threads 65 and the external threads 24 on a connection threaded hole 86 in FIGS. 9 and 10 respectively.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. An anti-vibration bolt structure comprising:
   a bolt shank, an external threaded sleeve, a countersunk screw, and a collar; wherein,
   said bolt shank has a bolt head on one end,
   said countersunk screw has a head on one end, said countersunk screw includes a shank with threads thereon, each end of said countersunk screw includes a depression to receive a wrench therein, said bolt shank includes a plurality of exterior axial teeth and a central through screw hole, said external threaded sleeve is formed as a helical spring, and an inner surface of said external threaded sleeve includes a plurality of axial engaging internal teeth; such that when said bolt shank is inserted into said external threaded sleeve, said axial teeth of said bolt shank engage said axial engaging internal teeth of said external threaded sleeve, and said collar contacts said head of said countersunk screw, a thread portion of said countersunk screw is screwed in said through screw hole to cause said collar on said head of said countersunk screw to abut an end of said external threaded sleeve.

2. The anti-vibration bolt structure as claimed in claim 1, wherein:

each pair of individual threads of said external threaded sleeve maintains a thread space between said individual threads in order to be compressible so as to absorb vibration.

3. An anti-vibration nut structure comprising:

a nut body, an internal threaded sleeve, and a securing screw; wherein said nut body includes a through hole and a concentric threaded hole of a smaller diameter than that of said through hole, said threaded hole includes a plurality of axial internal engaging teeth, and a screw hole is provided on a plate between said smaller threaded hole and said larger through hole; and said internal threaded sleeve is formed as a helical spring and includes a plurality of axial external engaging teeth, said external engaging teeth mesh with said external internal engaging teeth of said nut body when said threaded sleeve is inserted into said nut body, and one end of said internal threaded sleeve includes a screw hole corresponding in location to a location of said screw hole on said nut body, and said securing screw is received in said screw hole to firmly fix said threaded sleeve in said nut body.

4. The anti-vibration nut structure as claimed in claim 3, wherein:

each pair of individual threads of said internal threaded sleeve maintains a thread space between said individual threads in order to be compressible so as to absorb vibration, and said thread spaces can be adjusted by a compressing screw.

* * * * *